United States Patent [19]

Mamadzhanov et al.

[11] 4,334,987
[45] Jun. 15, 1982

[54] METHOD OF SEPARATION OF SOLID PHASE IN DRILLING MUD

[76] Inventors: Ulmas D. Mamadzhanov, Ts-I, dom 19, kv. 25; Vitold M. Bakhir, proezd Gaidara, 7"A", kv. 17; Vladimir I. Klimenko, Chilanzar, kvartal 23, dom 3, kv. 37; Jury G. Zadorozhny, Chilanzar, kvartal 2, dom 59, kv. 12; Stanislav A. Alekhin, Chilanzar, kvartal 24, dom 53, kv. 89, all of Tashkent, U.S.S.R.

[21] Appl. No.: 212,087

[22] PCT Filed: Nov. 27, 1979

[86] PCT No.: PCT/SU79/00128
 § 371 Date: Nov. 27, 1980
 § 102(e) Date: Sep. 17, 1980

[87] PCT Pub. No.: WO80/02041
 PCT Pub. Date: Oct. 2, 1980

[30] Foreign Application Priority Data

Mar. 27, 1979 [SU] U.S.S.R. ............................... 2736503
Mar. 27, 1979 [SU] U.S.S.R. ............................... 2736504

[51] Int. Cl.³ .............................................. B03B 5/00
[52] U.S. Cl. ..................................... 209/210; 209/45; 209/49; 209/127 R; 209/207

[58] Field of Search ............... 209/27, 210, 45, 46, 209/49, 1, 127 R, 129; 175/206, 66; 204/180 R

[56] References Cited

U.S. PATENT DOCUMENTS 2,219,312 10/1940 Hayward et al. .................. 175/66
3,642,605 2/1972 Chenel et al. .................. 204/180 R

FOREIGN PATENT DOCUMENTS 495794 11/1938 United Kingdom .................. 209/49

Primary Examiner—Ralph J. Hill
Attorney, Agent, or Firm—McAulay, Fields, Fisher, Goldstein & Nissen

[57] ABSTRACT

The method of separating the solid phase in a drilling mud includes forming from the drilling mud an adhesion layer 2 on a rotated curvilinear closed surface 3 partly projected into the drilling mud. Then a portion of this adhesion layer is separated onto another rotated curvilinear closed surface 5 positioned to contact a portion of the adhesion layer 2. The respective linear speeds of the adhesion layer 2 and of said another rotating closed curvilinear surface 5 in the area of their contact are selected to be substantially equal. The method of the invention provides for regulating the separation of the solid phase in drilling mud within a wide range depending on the mineralogical composition thereof.

10 Claims, 2 Drawing Figures

METHOD OF SEPARATION OF SOLID PHASE IN DRILLING MUD

The present invention relates to borehole-drilling techniques, and more particularly it relates to the methods of separating the solid phase in a drilling mud.

BACKGROUND ART

It is commonly known that drilling mud is a heterogeneous liquid system wherein colloid-size particles of the solid phase are always present. The presence of these particles is, from the well-drilling quality point of view, an essential prerequisite of adequate rheological properties of the drilling mud. The latter is expected to retain these qualities, essential as they are for optimization of the well-drilling conditions. However, stable retaining of the essential properties of the drilling mud throughout a drilling operation has been presenting a complicated problem.

The majority of drilling operations are carried out in clayey rock. The clayey rock being drilled is partly finely disintegrated, and the rock cuttings in the form of colloid particles get into the drilling mud.

Insufficiently effective purification of the drilling mud from rock cuttings upon several cycles of mud-pumping in the course of a well-drilling operation has been found to significantly alter the composition of the solid phase of the drilling mud, which necessitates using various methods of enhancing the drilling mud quality. Therefore, the quality purification of the drilling mud from rock cuttings is of paramount importance for the well-drilling operation.

Poor quality of the purification of the drilling mud has been a major cause of various emergencies and complications involving losses of the drilling mud, sticking of drill-pipes and casings, caving-in of rock from the borehole walls.

The technical and economic ratings of a drilling operation are greatly influenced by the quality of the drilling mud used, as well as by the degree of its purification from rock cuttings.

Quality purification of the drilling mud helps getting a well down faster, owing to the reduced content of the solid phase in the liquid one, and enhances the working environment of the bits and down-hole tools. Apart from stepping up the mechanical rate of drilling, quality purification of the drilling mud helps reducing the consumption of the materials spent on maintaining the required properties of the drilling mud, prolonging the life of the mud, avoiding emergencies and complications of the drilling operation.

In short, quality purification of the drilling mud from rock cuttings is an essential process of the well-drilling operation, significantly influencing technical and economic ratings of the operation.

All the hitherto known techniques of purifying drilling muds enable to remove from the circulating mud a certain proportion of solid particles with a certain degree of efficiency and quality.

Thus, the minimum size of particles that can be separated from a drilling mud on vibrating sieves is defined by the mesh size of the sieve. With the finer mesh used to enhance the quality of the purification, the pass-through capability of the sieve becomes seriously affected, and the loss of the drilling mud with the sludge is stepped up.

When purified in hydrocyclones, the drilling mud is diluted with water, and particles of a relatively high density are predominantly removed therefrom. The finer or less dense particles which become resident in the drilling mud as rock cuttings become dispersed therein would not be removed in hydrocyclones and numerous other purification devices currently in use.

There is known a method of regeneration of a stable clayey suspension of a drilling mud, according to which the drilling mud coming from the well and containing rock cuttings is prediluted with water and has greater particles removed therefrom. The thus diluted and precleaned drilling mud contains fine uncharged particles of cut rock and negatively charged colloidsize particles of clay. Then the negatively charged particles of clay are separated from the mud by being deposited on a rotating anode and subsequently removed with a scraper tool, the settling negatively charged particles of clay entraining therewith some of the uncharged particles which are likewise deposited on the rotating anode (Cf. the CZ Patent No. 109,992; Cl. 5, a, 31/20, dated Feb. 2, 1964).

The abovedescribed method is used to purify but a portion of the total flow of the drilling mud, while the far greater remaining portion of the mud is recirculated into the well in an uncleaned state. Furthermore, the stagewise purification, first, from the coarser particles, and, then, from the finer one is complicated and, hence, costly.

DISCLOSURE OF THE INVENTION

The present invention has for its aim the creation of a method of separating the solid phase in a drilling mud, which should provide for purifying the entire volume of the drilling mud coming from a well, in a relatively simple operation.

This aim is attained in a method of separation of a solid phase in a drilling mud, which in accordance with the present invention, comprises forming an adhesion layer from the drilling mud on a curvilinear closed surface partly projecting into the drilling mud and being rotated, and separating a portion of said layer onto another rotating curvilinear closed surface positioned to contact a portion of the adhesion layer, the linear speeds of the adhesion layer and of the other rotating closed curvilinear surface in the area of their contact being selected to be substantially equal.

It is expedient to have separated onto the other curvilinear closed surface the portion of the adhesion layer, rich in the coarser particles of the solid phase.

The above technique can be used for separating the adhesion layer formed on the external side of a rotating curvilinear closed surface. This enables to conduct the process of separating the solid phase in a drilling mut by regulating the value of the linear speed of the outer surface of the adhesion layer, and thus regulating the separation from the adhesion layer of solid particles having the density in excess of the density of the drilling mud from which the adhesion layer is formed.

It is also possible to separate onto the other curvilinear closed surface the portion of the adhesion layer, cleaned from the coarser particles of the solid phase.

This technique can be used for separating the adhesion layer formed on the internal side of a rotating curvilinear closed surface.

This enables to conduct the process of separating the solid phase in the drilling mud by regulating the value of the linear speed of the inner surface of the adhesion layer and that of the other curvilinear closed surface in the sense of stepping up this value, and thus regulating the separation from the adhesion layer of the particles of the solid phase of the drilling mud.

It is not less expedient to vary the value of the surface tension of the adhesion layer, while separating the solid phase of the drilling mud.

The variation of the surface tension of the adhesion layer facilitates separation of solid particles therefrom.

It is further expedient to vary the surface tension of the adhesion layer by acting thereupon with a directcurrent electric field.

By passing an electric current through the area of separation of the particles of the solid phase from the adhesion layer, the value of the surface tension is reduced, owing to an increased concentration of electrically charged particles in the surface layer. The reduced value of the surface tension of the adhesion layer of the drilling mud further enhances the conditions of separation of the solid phase of the drilling mud.

It is not less expedient to vary the value of the surface tension of the adhesion layer by altering the direction of the electric current in accordance with the mineralogic composition of the solid phase of the drilling mud.

The above technique enables to intensify the selective character of the removal of the solid phase. The feeding of a positive potential to the other curvilinear closed surface results in more efficient removal from the adhesion layer of the drilling mud of negatively charged particles of clay, as compared with the removal in the absence of the electric field.

On the other hand, the feeding of a negative potential to the other curvilinear closed surface intensifies the removal from the adhesion layer of the drilling mud of neutral yet heavy particles, e.g. barite ones, and of positively charged mineral particles.

It may be expedient to vary the value of surface tension of the adhesion layer by varying the intensity of the electric field in accordance with the particle size distribution in the solid phase of the drilling mud.

This technique broadens still further the range of control of the removal of the solid phase from a drilling mud.

Thus, by performing the withdrawal of the solid phase of the drilling mud by the other rotating curvilinear closed surface from the formed adhesion layer, while making a controllable electric current flow through the withdrawal area, and varying the polarity of the electric current, there is ensured efficient control of the process of separating the solid phase of the drilling mud within a broad range, according to the mineralogic composition of this phase. The separation of the solid phase is carried out in a simple and economic operation offering a high throughput.

BEST MODE FOR CARRYING OUT THE INVENTION

Given below is a description of an embodiment of the present invention, with reference being made to the accompanying drawings, wherein.

Figure 1:
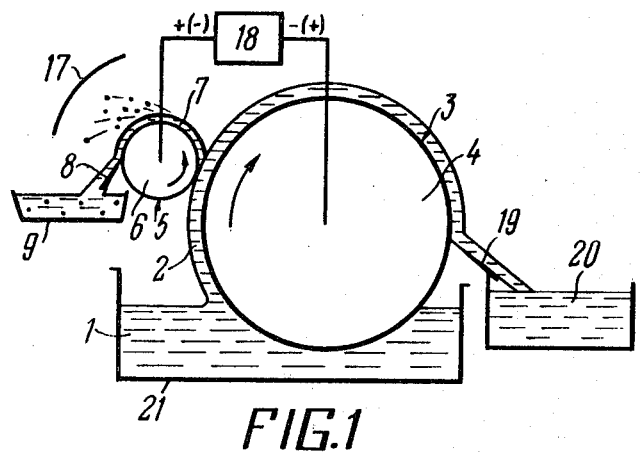
FIG. 1 illustrates schematically individual portions of the adhesion layer of the drilling mud, formed on the external side of a rotating cylindrical surface.

Referring now to the drawings, the method of separating the solid phase in a drilling mud includes forming from the drilling mud 1 (FIG. 1) an adhesion layer 2 on a rotating curvilinear closed surface 3.

In the embodiment being described this cylindrical surface is that of a drum 4 associated with a drive (not shown) for rotating the drum 4. The drum 4 is mounted so that a portion of its surface 3 projects into the drilling mud 1. In the course of the rotation, a portion of the adhesion layer 2 (by the depth thereof) is separated onto another curvilinear closed surface 5 which in the presently described embodiment is that of an auxiliary drum 6 operatively connected with a drive (not shown) for rotating this drum 6. The angular speeds of the rotating drums 4 and 6 are selected for their linear speeds in the area of contact of the adhesion layer 2 and of the other curvilinear closed surface 5 to be substantially equal.

The equality of the linear speeds provides for gradual stratification of the adhesion layer 2 into two portions with different contents of the solid phase particles.

The thickness of the formed adhesion layer 2 of the drilling mud 1 depends on the viscosity of the drilling mud 1 and on the speed of the rotation of the drum 4. The adhesion layer 2 contains solid particles of rock cuttings, the weighting material and the clayey solid phase. With the drum 4 rotating, the action of the centrifugal forces results in redistribution of the solid particles in accordance with their density and volume, with the coarser and heavier particles migrating toward the outer surface of the adhesion layer 2, and the finer particles, particularly, the colloidsize ones, remaining closer to the inner surface of this adhesion layer 2.

The speed of rotating the auxiliary drum 6 is set at a value providing for synchronous rotation of the surface 5 of the auxiliary drum 6 and of the outer surface of the adhesion layer 2.

The drums 4 and 6 are mounted for the gap between their respective peripheries to be not less than the thickness of the adhesion layer 2.

A solid phase particle within the adhesion layer 2 has acting thereon, on the one hand, centrifugal forces $$F = \frac{mV^2}{R} \quad (1)$$

where
"m" is the mass of the article,
"R" is the radius of the circle of its rotation,
"V" is the linear speed of its rotation; and, on the other hand, it has acting thereon its weight or gravity force, viscous friction forces and the forces "$F_1$" of the surface tension of the adhesion layer 2:

$$F_1 = 2\pi r\sigma \quad (2)$$

where
"r" is the radius of the particle of the solid phase of the drilling mud;
"$\sigma$" is the surface tension coefficient of the drilling mud 1.

The evaluation of the relative significance of the forces taking part in the distribution of the solid particles in the surface layer can be made by using the Froude cryterion or similarity number characterizing the ratio of the centrifugal forces to the forces of gravity:

$$Fr = \frac{\omega^2 R}{g}, \quad (3)$$

where
- "$\omega$" is the angular speed of the rotation of the drum 4, and "R" is the radius of the circle of rotation of the particle, while
- "g" is the gravity acceleration.

It is known that the minimum and maximum values of the Froude similarity number for real-life structures are within a range from 20 to 2000.

It can be derived from the abovesaid that in the calculation of the forces acting upon the solid particles in the adhesion layer 2 their weight may be neglected for practical reasons, as long as the centrifugal forces are 20 to 2000 times greater. Since the friction force between the surface of the solid phase particles and the liquid entraining them for rotation is directed tangentially to the surface of the drum 4 and perpendicularly to its radius, the peculiarities of the radial motion of the particles, i.e. the major laws governing the process of the separation of the phases and fractions (the purification process) may be considered without providing for the viscous friction forces.

Thus, by presuming the equality of the forces "F" and "$F_1$", it is possible to arrive at the condition of equilibrium of the particles in the adhesion layer 2 formed on the cylindrical surface 3 of the rotating drum 4:

$$\frac{\pi d^3}{6}(\rho_1 - \rho_2)\omega^2 R = 2\pi r\sigma = \pi d\sigma \quad (4)$$

or else, it can be expressed in relation to the diameter of the particle (which latter is conditionally taken to be spherical):

$$d = \sqrt{\frac{6\sigma}{(\rho_1 - \rho_2)\omega R^2}} \quad (5)$$

where
- "$\rho_1$" and "$\rho_2$" are, respectively, the densities of the solid phase and of the liquid;
- "d" is the diameter of the particle (d=2r);
- "R" is the radius of the circle of rotation of the particles;
- "$\sigma$" is the surface tension coefficient of the liquid of the adhesion layer.

It can be seen from expressions (4) and (5) that the motion of a particle of the diameter "d" in the adhesion layer 2 depends on the density of the drilling mud 1, the radius "R" of the circle of rotation of this particle, the speed of its rotation and the value of the surface tension of the adhesion layer 2. The radius of the circle of rotation of the particle is defined by the diameter of the drum 4. However, you cannot increase substantially the diameter of the drum 4 without encountering corresponding complexity of its manufacturing and mounting. Therefore, the major parameters of the process of separation of the solid phase of the drilling mud 1 on the rotating cylindrical surface 3 are the speed of the rotation of the drum 4 and the value of the surface tension of the adhesion layer 2.

As a result of the contact between the surface 5 of the auxiliary drum 6 and the adhesion layer 2, a portion of the last-mentioned layer becomes separated and taken by this surface.

Depending on the relative positions of the drums 4 and 6, the separated portion of the adhesion layer 2 contains different concentrations of the solid phase.

When the adhesion layer 2 is formed on the external surface of the drum 4 (FIG. 1), the auxiliary drum 6 takes up the portion of the adhesion layer 4, enriched in the coarser heavy particles of the solid phase of the drilling mud 1. This portion 7 of the adhesion layer 2 is directed by the scraper 8 into a trough 9.

Figure 2:
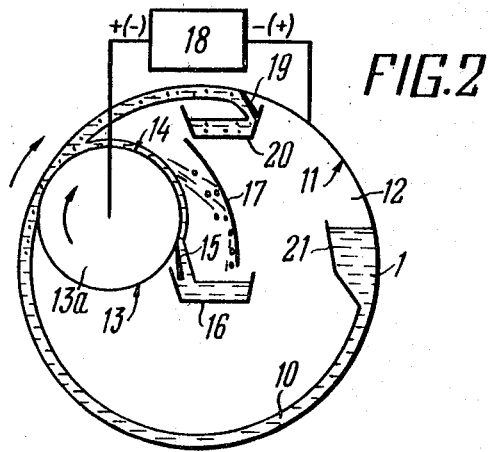
FIG. 2 illustrates schematically individual portions of the adhesion layer of the drilling mud, formed on the internal side of a rotating cylindrical surface.

When the adhesion layer 10 (FIG. 2) is formed on the internal surface 11 of a drum 12, the other closed curvilinear surface 13, i.e. that of the auxiliary drum 13a takes up the portion 14 of the adhesion layer 10, cleaned from the coarser and heavier particles of the solid phase of the drilling mud 1. In other words, the taken-up portion 14 of the adhesion layer 10 has been purified from the coarser particles of the solid phase of the drilling mud 1. A scraper 15 removes the portion 14 off the surface of the auxiliary drum 13a and directs it into a trough 16.

Particles of the solid phase projected from the portion 14 of the adhesion layer 10 by the centrifugal forces are intercepted by a guard 17, and flow down this guard 17 into the trough 16.

To enhance the efficiency of the separation of the solid phase of the drilling mud, the value of the surface tension of the adhesion layer is varied by acting thereupon with a direct-current electric field. The electric current flows via the circuit: current source 18 (FIGS. 1 and 2)-drum 4 (12)-adhesion layer 2 (10)-auxiliary drum 6 (13a). With a positive potential fed to the auxiliary drums 6 (13a), the separation of negatively charged colloid particles is intensified, whereas with the polarity reversed, more neutral and positively charged particles are separated on the auxiliary drum 6 (13a).

Depending on the particle size, or fraction content of the solid phase of the drilling mud, the value of the surface tension of the adhesion layer is controlled by varying the intensity of the electric field.

To remove the weighting material, the drilling mud 1 containing solid rock cuttings is disintegrated prior to the separation to the size of the weighting material particles. This speeds up the separation of the particles of the weighting material which are of a density at least twice as great as that of rock cuttings.

The portion of the adhesion layer 2(10), remaining on the drum 4 (12) after the separation of its portion 7 (14) by the auxiliary drum 6 (13a), is scraped off by a scraper 19 (FIG. 1) and directed into a receptacle 20. By controlling the speed of rotation of the drum 4 (12) and the value of the surface tension of the adhesion layer 2 (10) by varying the value and the polarity (or direction) of the electric current, it is possible to regulate the separation of the solid phase in the drilling mud within a broad range, to remove the excessive solid phase and to retain the fine particles of clay which make up the major colloid-sized component of the drilling mud.

The herein disclosed method is performed, as follows.

Following feeding the drilling mud 1 into a vessel 21 (FIG. 1), the drive (not shown) of the drum 4 is energized. As a result of the contact between the surface 3 of the drum 4 and the drilling mud 1, there is formed on the surface 3 the adhesion layer 2. The angular speed of the drum 4 iss set to correspond to the viscosity of the drilling mud 1 and the required degree of its purification. The gap between the respective peripheries of the drums 4 and 6 is adjusted to correspond to the thickness (or depth) of the adhesion layer 2. The speed of rotation of the auxiliary drum 6 is set to a value providing for equality of the linear speeds of the surface of the rotating auxiliary drum and of the outer surface of the adhesion layer 2. The required polarity of the electric current fed to the drums 4 and 6 from the direct-current source 18 is set to correspond to the mineralogic composition of the sludge in the drilling mud 1.

By gradually varying the value of the electric current the required degree of the purification of the drilling mud 1 is attained.

Thus, the herein disclosed method of centrifugal separation of the solid phase of the drilling mud 1 in electric fields of alternative polarity on rotating curvilinear closed surfaces 3, 5 enables to control within a broad range the amount of the solid phase and the size of the particles being separated, up to complete clarification of the liquid, which cannot be attained by using any of the hitherto known methods.

As an example of the implementation of the herein disclosed method, it is possible to supply the data obtained in the study aimed at determining the optimum parameters of the duty of purifying the drilling mud 1 from sludge taken off the surface of the adhesion layer 2 formed on the surface 3 of the drum 4.

Drums of various diameters from 100 to 500 mm were tested as the main drum 4, and were rotated at 10 r.p.m. to 10,000 r.p.m. The tested auxiliary drums 5 had similar parameters.

It was found that with the main drum 4 rotated at a speed from 10 r.p.m. to 150–200 r.p.m., the thickness of the adhesion layer 2 formed from the drilling mud 1 of a viscosity from 10 to 100 centipoise was 1.5 to 3 mm. The small thickness of the adhesion layer 2 was in these cases caused by the liquid flowing and dripping down from the surface of the drum 4 rotated at a low speed. This thickness of the adhesion layer 2 would not provide for required productivity of the drum 4.

Within the range of the speeds of rotation from 200 to 500 r.p.m. the thickness of the adhesion layer 2 on the surface 3 of the drum 4, with the drilling mud 1 viscosity from 10 to 100 centipoise, varied between 3 and 8 mm, and the solid particles of diameters between 0.8 and 4 mm were separated from the surface of the adhesion layer 2. All the particles of the diameters short of the abovementioned ones remained within the adhesion layer.

The study has shown that the angular speed of the surface of the adhesion layer 2, contacting the ambient air, is significantly lower (10 to 30 times) than the angular speed of the surface 3 of the drum 4. On account of this phenomenon, with the drum 4 rotated at speeds from 1000 and 2000 r.p.m., which are the optimum ones from the theoretical calculation made on the assumption that the adhesion layer 2 rigidly rotates with the drum 4, the particles of the solid phase of the minimum size of 0.07 mm cannot be separated to the required degree of purification.

If, however, the surface layer of the liquid is driven at the speed equalling the speed of rotation of the drum 4 by the action of the auxiliary drum 6, the theoretical calculation of the purification degree is completely sustained. When voltage of alternative polarity was fed to the drums 4 and 6 from the directcurrent current source 8, the fineness and degree of the purification were enhanced, owing to the reduced surface tension of the adhesion layer, with the minimum size of the solid phase particles removed from the adhesion layer being 20 microns. It was found that a potential corresponding to the charge of the sludge particles, or rock cuttings had to be fed to the drum 4 while purifying drilling muds. Thus, if the sludge is represented by negatively charged particles of clay, a negative potential is preferably fed to the drum 4, whereas with the sludge being represented by positively charged calcite particles, it is a positive potential that preferably has to be fed to the drum 4.

The studies also proved that to attain quality purification of drilling muds of viscosities from 10 to 100 centipoise (to the minimum size of the removed particles equalling 20 microns), it was necessary to rotate the drum 4 at speeds from 1000 to 2000 r.p.m. and to feed to the drum 4 the voltage of 10 to 20 V.

Thus, to purify the relatively clear drilling mud (30 to 40% solid phase) with the maximum size of the solid particles up to 200–300 microns, the diameter of the main drum was selected to be 420 to 500 mm, and the speed of its rotation was set at 1800 to 2000 r.p.m. The diameter of the auxiliary drum 6 was preferably 140 to 160 mm, and the speed of its rotation was set at 5000 to 6000 r.p.m. Under such conditions solid particles as small as 12 to 16 microns were separated from the adhesion layer.

It was further found that when the drilling mud with a high content of sludge and the size of the solid particles in excess of 1 mm had to be purified, the diameter of the main drum was preferably 100 to 120 mm, and the speed of its rotation was 1000 to 1200 r.p.m. The auxiliary drum diameter was preferably from 30 to 40 mm, and the speed of its rotation was 3000 to 3600 r.p.m. Solid particles of a size from 40 to 50 microns were separated from the adhesion layer 2.

The economic effectiveness of the herein disclosed method of separating the solid phase in a drilling mud is made up of the reduced purification cost, owing to getting rid of a multistage purification system, of the prolonged life of the drilling mud and of faster drilling, due to the enhanced purification quality of the drilling mud.

INDUSTRIAL APPLICABILITY

The disclosed method can be employed to utmost effectiveness when drilling oil, fuel gas and survey wells.

We claim:

1. A method of separating the solid phase in a drilling mud, comprising the steps of:

forming an adhesion layer of the drilling mud onto a main curvilinear closed surface which partly projects into a vessel containing the mud by rotating said main curvilinear surface through the mud in said vessel;

separating a portion of said adhesion layer onto an auxiliary rotating curvilinear closed surface positioned adjacent to said main curvilinear surface to contact a portion of said adhesion layer; and independently rotating said main curvilinear surface and said auxiliary curvilinear surface at speeds of rotation such that the linear speed in the area of contact of said adhesion layer on said main curvilinear surface is the same as the linear speed of the surface of said auxiliary rotating curvilinear closed surface.

2. The method according to claim 1, including:

separating onto said auxiliary surface a portion of said adhesion layer enriched in the coarser particles of the solid phase.

3. The method of claim 1, including
separating from said adhesion layer and applying to said auxiliary surface a portion of said adhesion layer purified from coarser particles of the solid phase of said adhesion layer.

4. The method according to claim 1, including:
positioning said main surface and said auxiliary surface adjacent to each other so that there is a gap between the peripheries thereof and with the periphery of said auxiliary surface within said adhesion layer, said gap being less than the thickness of said adhesion layer, and
synchronizing said speed of rotation of the periphery of said auxiliary surface with the outer surface of said adhesion layer such that the rotation of said main surface redistributes the solid particles in accordance with their density and volume by centrifugal forces.

5. The method of claim 1, including:
varying the value of the surface tension of said adhesion layer while separating the solid phase of said drilling mud.

6. The method of claim 1 including:
varying the surface tension of said adhesion layer by applying a direct current electric field.

7. The method of claim 6, wherein:
said electric field is applied to said adhesion layer by applying said direct current field between said main surface and said auxiliary surface.

8. The method of claim 1 including:
applying a direct current electric field between said main surface and said auxiliary surface through said adhesion layer; and
varying the value of the surface tension of said adhesion layer by altering the direction of the electric current in dependence on the mineralogic composition of the drilling mud.

9. The method of claim 1 including:
applying an electric field to sand adhesion layer through said main surface and said auxiliary surface; and
varying the intensity of the electric field in dependence on the particle size content of the solid phase of the drilling mud.

10. The method of claim 1, wherein:
the main curvilinear closed surface onto which said adhesion layer is formed is internally of said closed surface, and
said auxiliary closed surface is contained within said main closed surface.

* * * * *